May 23, 1939.  E. E. HEWITT  2,159,797
FLUID PRESSURE BRAKE
Filed Feb. 26, 1938
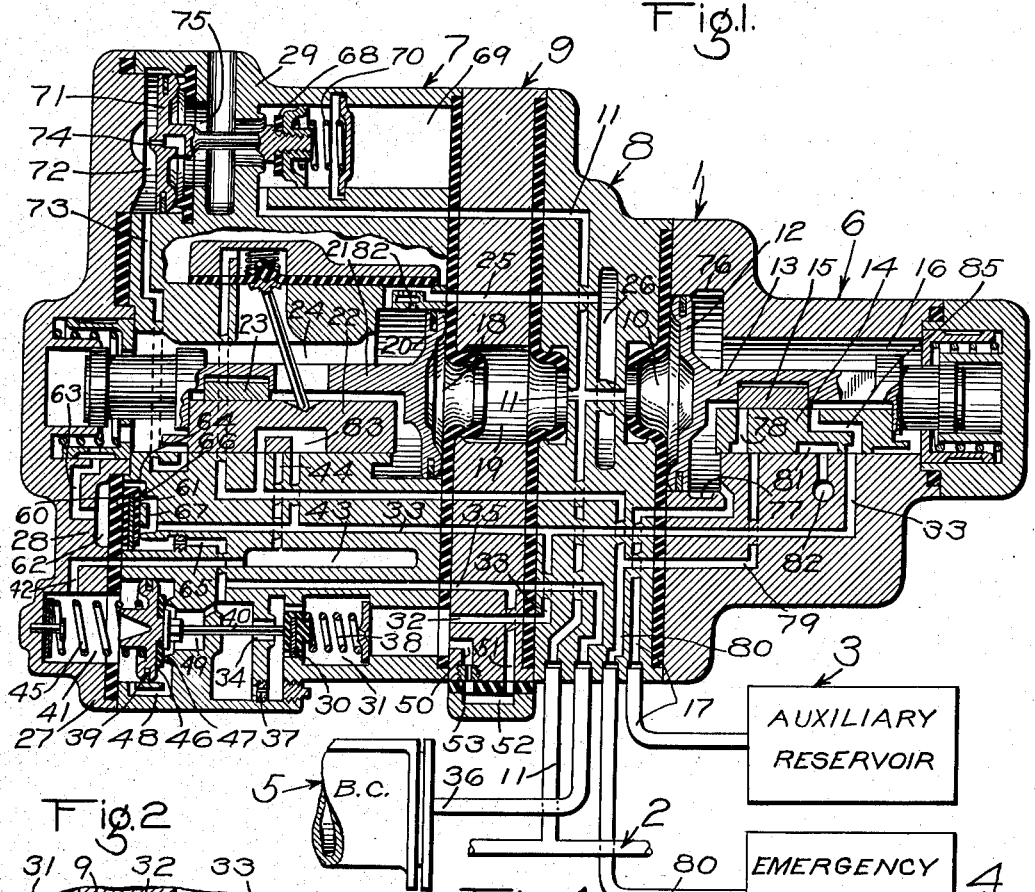
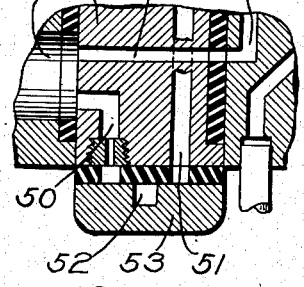
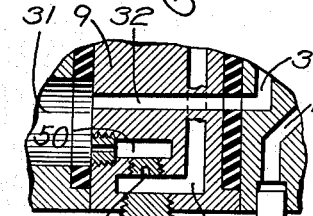
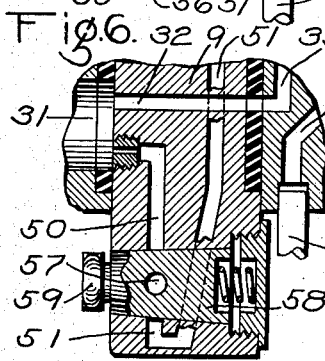
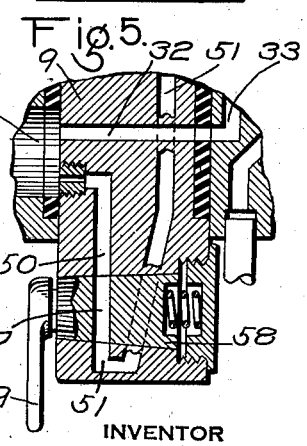
INVENTOR
ELLIS E. HEWITT
BY
*A. M. Higgins*
ATTORNEY Patented May 23, 1939

2,159,797

UNITED STATES PATENT OFFICE 2,159,797

FLUID PRESSURE BRAKE

Ellis E. Hewitt, Edgewood, Pa., assignor to The Westinghouse Air Brake Company, Wilmerding, Pa., a corporation of Pennsylvania Application February 26, 1938, Serial No. 192,812

5 Claims. (Cl. 303—35)

This invention relates to fluid pressure brake equipment and more particularly to that type of equipment disclosed in the patent of Clyde C. Farmer No. 2,031,213, issued February 18, 1936, and known as the "AB" brake equipment.

Included in the above mentioned type of brake equipment is a brake cylinder build up control valve mechanism which, when an emergency application of the brakes is being effected, functions to first provide a limited initial inshot of fluid under pressure to the brake cylinder to apply the brakes with sufficient force to start the slack in the train to close or gather, and to then provide a slow build up in brake cylinder pressure to insure the gentle gathering of the slack in the train, and lastly to provide a final inshot of fluid under pressure to the brake cylinder which continues until the full emergency brake cylinder pressure is obtained. On a long train, such for instance as a train of a hundred cars or more, where there is considerable slack to gather, this control of brake cylinder pressure is very desirable in that it effectively prevents harsh gathering or closing of the slack and thereby prevents heavy damaging shocks from being created in the train.

On shorter trains, say for instance fifty cars or less, the train slack will of course be materially less than on the longer trains and consequently the slack closing or gathering shocks in effecting an emergency application of the brakes, will be of less magnitude than on the longer trains, so that the build up of brake cylinder pressure may be at a faster rate than on the longer train. On short trains employed in fast freight service where the trains are operated at high speed i. e., on passenger schedules, this increase in the rate of build up of brake cylinder pressure is very desirable to insure prompt and safe emergency stops. It should here be mentioned that certain cars equipped with the above mentioned type of brake equipment may be employed at one time in long trains and at another time in short trains and since, in effecting an emergency application of the brakes, the rate of increase in brake cylinder pressure on long trains is too slow for the proper safe control of the brakes on short trains operating at high speed, it is the principal object of the present invention to provide a fluid pressure brake equipment of the above mentioned type with means whereby the brake controlling valve device thereof may be readily conditioned to provide the desired rate of emergency build up of brake cylinder pressure for either long or short trains.

According to this object means are provided for rendering the brake cylinder build up control valve mechanism either effective or ineffective to wholly control the rate of increase in brake cylinder pressure in effecting an emergency application of the brakes, thus an "AB" type of brake equipment may be readily conditioned for use in short trains to be operated at high speeds or for use in long freight trains to be operated at slower speeds. This conditioning feature makes it possible to quickly and easily condition the brake equipment for either of the above mentioned train services thus facilitating the transfer of a car or cars from one train service to the other. In the present embodiment of the invention the conditioning means are embodied in an adapter or filler which is clamped between the pipe bracket and the emergency portion of the brake controlling valve device of the ordinary "AB" freight brake equipment, but it will be understood that, if desired, the conditioning means may be originally included in the pipe bracket or any other suitable portion of the brake controlling valve device.

Another object of the invention is to provide a fluid pressure brake equipment of the above mentioned type having a brake cylinder communication which by-passes the brake cylinder pressure build-up control valve mechanism for assisting in controlling the rate of build up of brake cylinder pressure and which is adapted to be cut into or out of controlling condition through the medium of an adjustable blanking plate, a removable plug or a suitable valve.

A further object of the invention is to provide means adapted to be added to a standard "AB" brake equipment for selectively rendering the brake cylinder pressure build up control mechanism embodied therein either effective to wholly control the rate of increase in brake cylinder pressure in effecting an emergency application of the brakes or for cutting additional build up control means into operation to increase the rate of build up in brake cylinder pressure.

Other objects and advantages will appear in the following more detailed description of the invention.

In the accompanying drawing Fig. 1 is a diagrammatic view, mainly in section, of a fluid pressure brake equipment embodying the means for conditioning the equipment for either long or short train operation, the several parts of the equipment being shown in emergency position and the conditioning means being shown in position to condition the equipment for short train operation; Fig. 2 is an enlarged fragmentary sectional view showing the conditioning means in position to render the build up control valve mechanism effective to alone control the rate of build up of brake cylinder pressure; Figs. 3 and 4 are enlarged fragmentary sectional views similar to Fig. 2 but showing a modification of the means for conditioning the equipment for either long or short train operations, Fig. 3 showing the condition means in position for short train operations and Fig. 4 showing the conditioning means in position for long train operations; Figs. 5 and 6 are enlarged fragmentary sectional views similar to Figs. 3 and 4, respectively, but showing a modification of the invention in which a rotatable valve is employed for cutting the conditioning means into or out of operation.

As shown the brake equipment may comprise the brake controlling valve device 1, a brake pipe 2, an auxiliary reservoir 3, an emergency reservoir 4 and a brake cylinder 5.

The brake controlling valve device 1 may comprise an equalizing portion 6, an emergency portion 7 and a pipe bracket 8, the service and emergency portions being clamped to opposite sides of the pipe bracket, there being an adapter or filler portion 9 interposed between the emergency portion and the pipe bracket.

With the exception of the adapter or filler portion 9, the brake controlling valve device 1 may be identical in every respect with the corresponding device shown and described in the aforementioned Farmer patent, however, in the present case the showing of the device has been simplified by omitting several parts, passages and ports which are not necessary to a clear understanding of the invention.

The equalizing portion 6 comprises a casing having a piston chamber 10 which is connected through a passage and pipe 11 to the brake pipe 2 and which contains a piston 12 having a stem 13 adapted to actuate a main slide valve 14 and an auxiliary slide valve 15 contained in a valve chamber 16 which is connected through a passage and pipe 17 to the auxiliary reservoir 3.

The emergency portion 7 may comprise a casing having a piston chamber 18 which is in constant open communication with the brake pipe passage 11 by way of a passage 19 which is provided in the filler portion 9. Contained in chamber 18 is an emergency piston 20 having a stem 21 which is adapted to actuate a main slide valve 22 and an auxiliary slide valve 23 contained in a valve chamber 24 which is connected through a passage 25 to a quick action chamber 26 formed in the pipe bracket 8, which passage extends through the filler portion.

Associated with the emergency portion is a brake cylinder build up control valve mechanism which may comprise an inshot valve portion 27, and a timing or final inshot valve portion 28. Also associated with the emergency portion is a quick action vent valve device 29.

The inshot valve device comprises an inshot valve 30 which is contained in a chamber 31 having constant open communication with a passage 32 in the filler portion, which passage 32 is in registration with an application and release passage 33 leading to the seat for the equalizing main slide valve and also to the seat for the emergency slide valve and to the timing valve device, a portion of the passage 33 being formed in the filler portion 9. The valve 30 is operative to control communication through a passage 34 leading from the chamber 31 to a brake cylinder passage 35 which is connected to a pipe 36 leading to the brake cylinder, a portion of the passage 35 being formed in the filler portion 9. The chamber 31 is further connected to the passage 35 by way of a choke passage 37. Contained in the chamber 31 is a spring 38 which constantly biases the valve 30 in the direction toward its seat.

For controlling the operation of the valve 30 there is provided a piston 39 having a stem 40 which operatively engages the valve. At one side of this piston there is a chamber 41 which is connected through a passage 42, a small volume chamber 43 and a passage 44 to the seat for the emergency main slide valve. Contained in the chamber 41 and engaging the face of the piston is a spring 45 which has a greater pressure value than the spring 38 acting on the valve 30 in opposition to the spring 45. The rear face of the piston 39 is provided with a gasket 46 which is adapted to engage a valve seat 47 formed in the casing. This gasket is normally maintained in sealing engagement with the seat 47 by the spring 45 acting through the medium of the piston, thus separating the outer seated area of the rear face of the piston from the inner seated area thereof. The outer seated area of the piston is connected through a passage 48 to the piston chamber 41 and the inner seated area is exposed to a chamber 49 which is in constant open communication with the brake cylinder passage 35.

The filler portion 9 is provided with a choked passage 50 which is in open communication with inshot valve chamber 31 and is further provided with a passage 51 which is in open communication with the brake cylinder passage 35. For short train operation where a fast rate of brake cylinder pressure build up is desired, the passages 50 and 51 are connected together so as to form a communication from the chamber 31 to that portion of the brake cylinder passage 35 leading directly to the brake cylinder. This communication by-passes the control valve mechanism so that such mechanism is rendered ineffective to wholly control the rate of increase in brake cylinder pressure. As shown in Fig. 1, the passages 50 and 51 are connected together by way of a cavity 52 in a plate 53 which is adjustably secured to the filler portion 9, so that it may be moved to the position in which it is shown in Fig. 2 to cut out the communication between the passages 50 and 51 and thereby condition the brake controlling valve mechanism 1 for long train operation. As shown in Fig. 3 the passage 50 is connected to the passage 51 by way of a screw threaded opening 54 in an interior wall of the filler portion for short train operation and for long train operation a plug 55 is screwed into opening as shown in Fig. 4 to cut off communication between the passages 50 and 51, the filler member being provided with an opening through which the plug may be inserted, which opening is adapted to be closed by a screw plug 56; and as shown in Fig. 5 the passages 50 and 51 are connected together by a port 57 in a plug valve 58 rotatably mounted in the filler member, which valve is provided with an operating handle 59 through the medium of which the valve may be rotated to its long train operation as shown in Fig. 6 in which position the valve cuts off communication between the pasages 50 and 51.

The timing or inshot valve device 28 may comprise a flexible diaphragm 60 and a timing or inshot valve 61, which valve is under the control of the flexible diaphragm. At one side of this diaphragm is a chamber 62 which is connected through a passage 63 to the emergency valve chamber 24, and at the other side of the diaphragm is a chamber 64 which is connected through a choke passage 65 to the brake cylinder passage 35 and which contains the valve 61. The valve is adapted to engage a valve seat 66 which is formed on the casing and when so seated the inner area thereof is exposed to a chamber 57 which is in constant open communication with the passage 33.

The quick action vent valve device may be identical with the corresponding vent valve device shown in the aforementioned Farmer patent and in view of this will only be briefly described here. As shown this device comprises a quick action vent valve 68 which is contained in a chamber 69 constantly open to the brake pipe passage 11 and which is normally maintained seated by the action of a spring 70 contained in the chamber. The operation of the valve 68 is controlled by a piston 71 which is contained in a piston chamber 72 connected through a passage 73 to the seat for the emergency main slide valve. The quick action piston is provided with a vent port 74 of small diameter which connects the chamber 72 to a chamber 75 constantly open to the atmosphere.

In initially charging the equipment, fluid under pressure which is supplied to the brake pipe 2 in the usual manner flows through pipe and passages 11 to the equalizing piston chamber 10, chamber 19 in the filler portion 9 and consequently to the emergency piston chamber 18, and to the quick action vent valve chamber 69.

With the equalizing piston 12 in release position fluid under pressure flows from the piston chambers 10 through feed grooves 76 and 77 to the equalizing valve chamber 16, and from thence flows through passage and pipe 17 to the auxiliary reservoir 3. From the chamber 16 fluid under pressure flows to the emergency reservoir 4 by way of a port 78 in the main slide valve 14, a passage 79 and a passage and pipe 80. With the equalizing main slide valve in release position the brake cylinder 5 is open to the atmosphere by way of pipe 36, passage 35, passage 34 in the inshot valve device, inshot valve chamber 31, passages 32 and 33 a cavity 81 in the equalizing main slide valve 14 and a passage 82.

With the emergency piston 20 in release position, fluid under pressure being supplied to the emergency piston chamber 18 flows through a small port 82 to the passage 25 and from thence flows to the quick action chamber 26 and the emergency slide valve chamber 24. From the chamber 24 fluid under pressure flows through passage 63 to the diaphragm chamber 62 of the timing valve device 28, the pressure of fluid in chamber 62 acting on the diaphragm 60 to maintain the timing valve 61 seated on the seat rib 66. With the emergency main slide valve 22 in release position the piston chamber 41 of the inshot valve device is connected to the atmosphere by way of passage 42, chamber 43, passage 44, a cavity 83 in the slide valve 22 and passage 33. Even though the chamber 41 is thus connected to the atmosphere the spring 45 acts to maintain the inshot valve 30 open against the opposing pressure of the spring 38.

From the foregoing description of the charging it will be seen that the brakes are released and that the equipment is fully charged with fluid under pressure.

Assuming now that the passages 50 and 51 are connected together as shown in any one of the Figs. 1, 3 or 5 of the drawing, and it is desired to effect an emergency application of the brakes, an emergency reduction in brake pipe pressure is effected in the usual manner which causes the several parts of the equalizing portion and emergency portion to move to the position in which they are shown in Fig. 1.

With the equalizing piston 12 and slide valves 14 and 15 associated therewith in this position, fluid under pressure flows from the auxiliary reservoir to the inshot valve chamber 31 of the inshot valve device by way of pipes and passage 17 equalizing valve chamber 16, a port 85 in the main slide valve 14 and passages 33 and 32.

With the emergency piston 20 and associated slide valves 22 and 23 in emergency position, fluid under pressure flows from the emergency reservoir to the inshot valve chamber 31 of inshot valve device by way of pipe and passage 80, cavity 83 in the emergency main slide valve 22 and passages 33 and 32.

Fluid under pressure thus supplied to the chamber 31 flows past the inshot valve 30 through passage 34, passage 35 and pipe 36 to the brake cylinder and also flows through the connected passages 50 and 51 to the passage 35 and thence to the brake cylinder. Now when the brake cylinder pressure has been increased sufficiently to cause the usual brake shoes to engage the wheels so as to start the slack in the train to gather or close, the piston 39 of the inshot valve device will be caused to move toward the left against the opposing pressure of the spring 45 and as a result of such movement the spring 38 causes the valve 30 to seat and thus close off communication from the valve chamber 31 to the passage 35 by way of the passage 34. With the passage 34 closed fluid under pressure flows from chamber 31 to the passage 35 and consequently to the brake cylinder by way of the restricted passage 37, and since the flow of fluid from chamber 31 to the passage 35 by way of the connected passages 50 and 51 continues the rate of increase in brake cylinder pressure will be governed according to the flow area of the restricted passage 37 and the restricted passages 50.

With the main slide valve 22 of the emergency valve device in emergency position fluid under pressure flows from the emergency valve chamber 24 and connected quick action chamber 26 through passage 73 to the quick action piston chamber 72 causing said piston to move inwardly and unseat the vent valve 68 against the opposing action of the spring 70. With the vent valve unseated fluid under pressure is vented from the brake pipe to the atmosphere by way of passage 11 and past the open vent valve. Fluid under pressure supplied to the quick action piston chamber 72 flows through port 74 in the piston to the atmosphere thus the pressure of fluid to the emergency piston chamber 24 and quick action chamber 26 is reduced to atmospheric pressure. Now when the increasing brake cylinder pressure present in chambers 64 and 67 of the timing valve device becomes slightly greater than the reducing quick action chamber pressure present in chamber 62, the flexible diaphragm 60 will flex outwardly and permit the timing valve 61 to unseat. With the timing valve unseated fluid under pressure flows from the passage 33 through restricted passage 65, passage 35 and pipe 36 to the brake cylinders thus accelerating the rate of increase in brake cylinder pressure over that which would be obtained by the flow of fluid through passages 37 and 50.

It will here be understood that if the train is of such a length that it is desirable to have a rapid straight away build up of brake cylinder pressure the choked passage 50 may be made of such diameter or flow area as to render the control of the rate by the inshot valve device ineffective. If however, it is desired to have an intermediate retarded rate of build up of brake cylinder pressure at a faster rate than the flow of fluid through the choked passage 37 alone will produce the flow area of the choked passage 50 is made such as to provide the proper acceleration of the rate of build up.

The additional means for controlling the rate of build up in brake cylinder pressure in effecting an emergency application of the brakes does not materially change or modify any of the other operating characteristics of the brake equipment, and in view of this a description of the brake equipment in its other control positions is deemed unnecessary.

While three illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake equipment, in combination, a brake controlling valve device comprising a pipe bracket and emergency valve device and an equalizing valve device removably clamped together, said emergency and equalizing valve devices being operative to supply fluid under pressure to effect an emergency application of the brakes, valve means operative to regulate the flow of fluid supplied by the equalizing and emergency valve devices, means adapted to be interposed between said pipe bracket and emergency valve device comprising fluid pressure control means through which brake applying fluid supplied by said equalizing and emergency valve devices may flow without control by said valve means to accelerate the rate of build up in the brake applying fluid, and means selectively operative to render said fluid pressure control means effective or ineffective.

2. In a fluid pressure brake equipment of the type having a brake controlling valve device comprising a pipe bracket and an emergency valve device clamped together, said emergency valve device being operative to supply fluid under pressure to effect an emergency application of the brakes and having a communication through which the brake applying fluid flows, and also having valve means interposed in said communication for regulating the flow of fluid through said communication, a filler member adapted to be interposed between said emergency valve device and pipe bracket and having passages which, when the filler member is so interposed, form parts of said communication and also having a passage connecting said communication at one side of the valve means to the communication at the other side of the valve means and through which the brake applying fluid may by-pass the valve means, and means for selectively opening and closing the last mentioned passage.

3. In a fluid pressure brake equipment of the type having a brake controlling valve device comprising a pipe bracket and an emergency valve device clamped together, said emergency valve device being operative to supply fluid under pressure to effect an emergency application of the brakes and having a communication through which the brake applying fluid flows, and also having valve means interposed in said communication for regulating the flow of fluid through said communication, a filler member adapted to be interposed between said emergency valve device and pipe bracket and having passages which, when the filler member is so interposed, form parts of said communication and also having a passage connecting said communication at one side of the valve means to the communication at the other side of the valve means and through which the brake applying fluid may flow without regulation by said valve means, and means carried by said filler member for selectively opening and closing the last mentioned passage.

4. In a fluid pressure brake equipment of the type having a brake controlling valve device comprising a pipe bracket and an emergency valve device clamped together, said emergency valve device being operative to supply fluid under pressure to effect an emergency application of the brakes and having a communication through which the brake applying fluid flows, and also having valve means interposed in said communication for regulating the flow of fluid through said communication, a filler member adapted to be interposed between said emergency valve device and pipe bracket and having a passage by-passing said valve means, and means for selectively opening and closing said passage.

5. In a fluid pressure brake equipment of the type having a brake controlling valve device comprising a pipe bracket and an emergency valve device clamped together, said emergency valve device being operative to supply fluid under pressure to effect an emergency application of the brakes and having a communication through which the brake applying fluid flows, and also having valve means interposed in said communication for regulating the flow of fluid through said communication, a filler member adapted to be interposed between said emergency valve device and pipe bracket and having a passage by-passing said valve means, said passage when open permitting the flow of brake applying fluid without regulation by said valve means and when closed insuring regulation of the flow of the brake applying fluid, and means for selectively opening and closing said passage.

ELLIS E. HEWITT.